United States Patent
Ackerley et al.

(10) Patent No.: US 8,544,325 B2
(45) Date of Patent: Oct. 1, 2013

(54) CAPACITIVE DISPLACEMENT TRANSDUCER FOR A WEAK-MOTION INERTIAL SENSOR

(75) Inventors: Nicholas Jason Ackerley, Kanata (CA); Timothy Philip Setterfield, Ottawa (CA); Mark Jonathan Brice Hayman, Dunrobin (CA)

(73) Assignee: Nanometrics Inc., Kanata, Ontario (CA)

( * ) Notice: Subject to any disclaimer, the term of this patent is extended or adjusted under 35 U.S.C. 154(b) by 532 days.

(21) Appl. No.: 12/709,429

(22) Filed: Feb. 19, 2010

(65) Prior Publication Data
US 2010/0223998 A1    Sep. 9, 2010

(30) Foreign Application Priority Data
Mar. 6, 2009    (CA) ...................................... 2658141

(51) Int. Cl.
*G01P 15/00*    (2006.01)
*G01P 15/125*    (2006.01)

(52) U.S. Cl.
USPC ..................................... 73/514.32; 73/514.01

(58) Field of Classification Search
USPC .............................. 73/514.14, 514.32, 514.01
See application file for complete search history.

(56) References Cited

U.S. PATENT DOCUMENTS

| | | | |
|---|---|---|---|
| 5,211,051 A | | 5/1993 | Kaiser et al. |
| 5,353,641 A | * | 10/1994 | Tang ........................... 73/514.18 |
| 5,404,749 A | * | 4/1995 | Spangler ..................... 73/514.29 |
| 6,035,714 A | | 3/2000 | Yazdi et al. |
| 6,109,114 A | * | 8/2000 | Hartley et al. ................... 73/774 |
| 2005/0229704 A1 | * | 10/2005 | Murata et al. ............... 73/514.16 |
| 2009/0031809 A1 | * | 2/2009 | Lin et al. ..................... 73/514.32 |

FOREIGN PATENT DOCUMENTS

GB    2444373 A    6/2008

OTHER PUBLICATIONS

Search Report, Application No. GB1003624.2, Jul. 2, 2010.

* cited by examiner

*Primary Examiner* — Hezron E Williams
*Assistant Examiner* — Nathaniel Kolb (57) ABSTRACT

A broadband weak-motion inertial sensor includes a frame, a movable inertial mass, a forcing transducer for keeping the inertial mass stationary relative to the frame during operation, and a flexure for suspending the movable mass in the frame. Two or more closely spaced, substantially parallel capacitor plates, at least one attached to the frame, and one attached to the movable inertial mass, form a capacitive displacement transducer. The capacitor plates have a plurality of apertures with dimensions and arrangement chosen to simultaneously minimize damping induced thermal noise and give a high spatial efficiency. In an implementation, three capacitor plates are provided. The capacitor plates each have a same hexagonal pattern of circular holes; the holes are aligned on all included capacitor plates. Radius and spacing of the holes are dictated by a relationship that determines the minimum damping per unit capacitively effective area for a desired spatial efficiency, gap height and capacitor plate thickness. In an implementation, the capacitor plates are made of a printed circuit board material which, through etching of the thin conductive layer, can be mounted directly to a conductive frame and conductive inertial mass without the use of non-conductive spacers.

20 Claims, 8 Drawing Sheets

CAPACITIVE DISPLACEMENT TRANSDUCER FOR A WEAK-MOTION INERTIAL SENSOR

PRIORITY CLAIM

This application claims priority from Canadian Application for Patent No. 2,658,141 filed Mar. 6, 2009, the disclosure of which is hereby incorporated by reference.

TECHNICAL FIELD

The present invention relates to the field of capacitive displacement transducers that can be used in inertial sensors and more particularly to low damping spatially efficient capacitive displacement transducers that can be used in broadband weak-motion inertial sensors.

INTRODUCTION AND SUMMARY

A mechanical system in free oscillation in a fluid is damped to rest by viscous damping forces proportional to the velocity of the mass. While being damped, the mechanical system transfers energy to the surrounding fluid. If the mechanical system is presumed to be in thermal equilibrium with the surrounding fluid, this energy must be transferred back to the system by way of particle collisions. These particle collisions impart forces, inducing accelerations that a displacement transducer interprets as a valid signal. This is an instance of the fluctuation dissipation theorem, and the result is known as thermal noise.

Thermal noise sets a fundamental limit on the accuracy of a mechanical instrument sensing displacement, velocity, or acceleration. More specifically, thermal noise created by the interaction of an inertial mass with the surrounding fluid impairs the ability of an inertial sensor to measure ground motion. Thermal noise due to viscous damping has a white spectrum, and is therefore observed at all frequencies. Due to the fact that the Brownian motion of fluid particles causes thermal noise, the limit that it places on the accuracy of an inertial sensor is often referred to as the Brownian noise floor.

Figure 1:
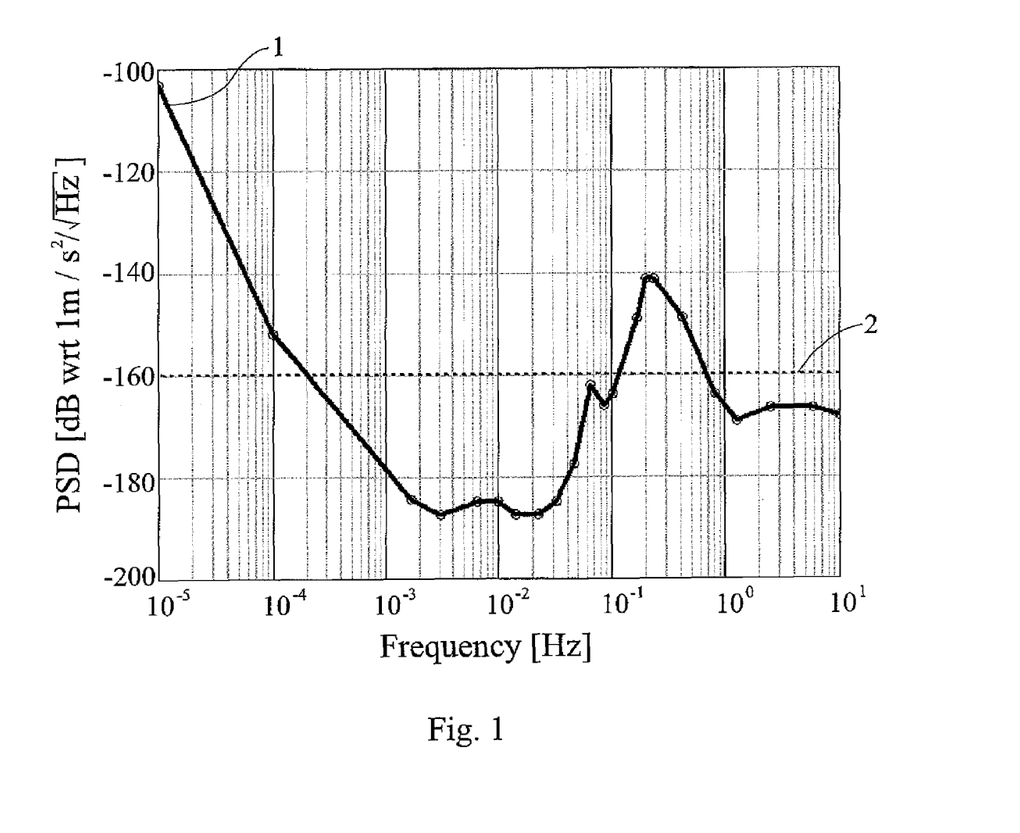
FIG. 1 illustrates a graph that shows the practical limits of seismometer sensitivity.
Figure 2A:
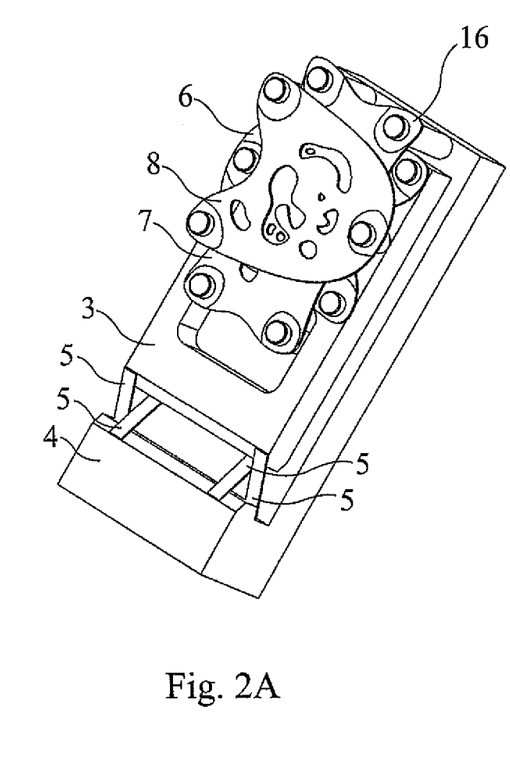
FIGS. 2A, 2B, 2C and 2D illustrate general embodiment of an inertial sensor axis comprising an inertial mass, flexure elements, a frame, a forcing transducer and a triple plate capacitive displacement transducer with holes in one or more of the plates.
Figure 2B:
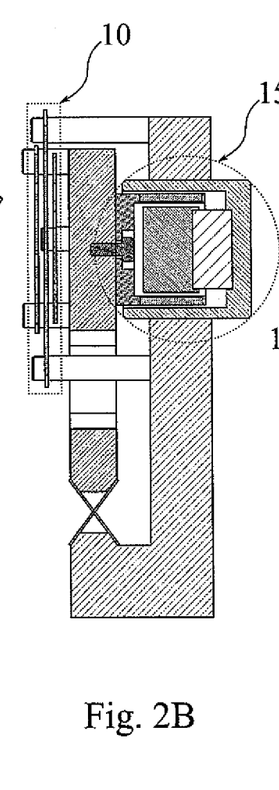
Figure 2C:
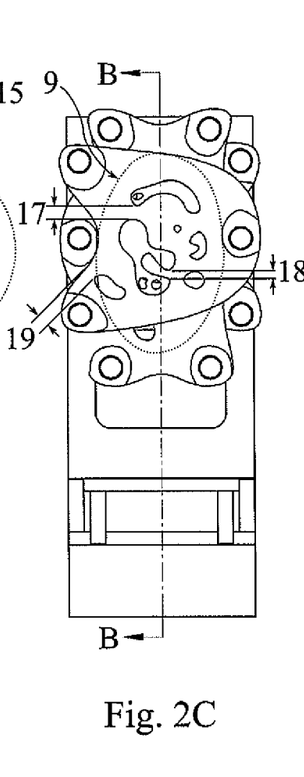
Figure 2D:
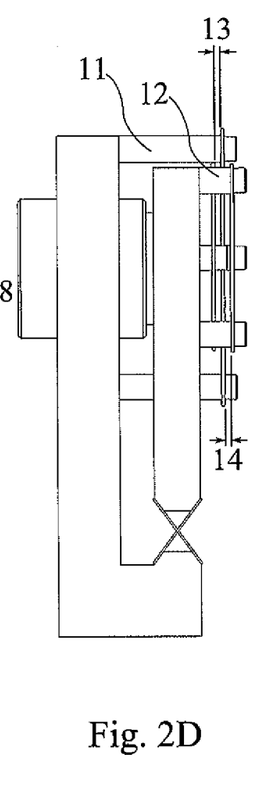
Figure 3A:
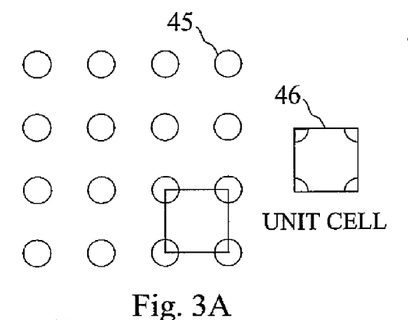
FIGS. 3A, 3B, 3C, 3D, 3E and 3F illustrate several possible embodiments of the hole pattern and hole shape.
Figure 3B:
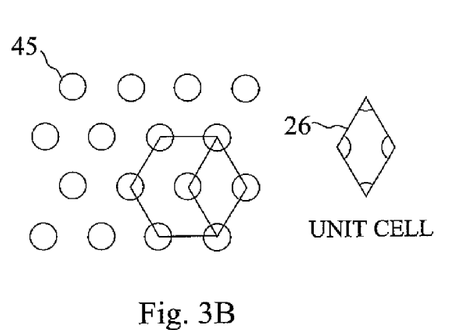
Figure 3C:
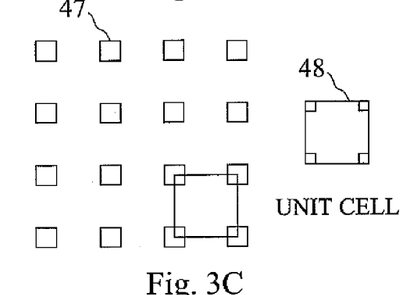
Figure 3D:
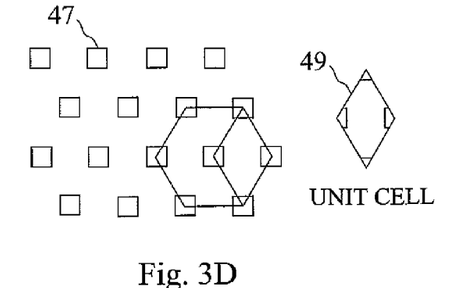
Figure 3E:
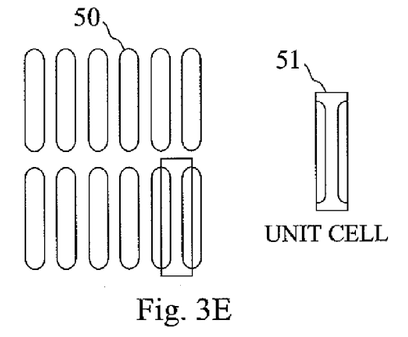
Figure 3F:
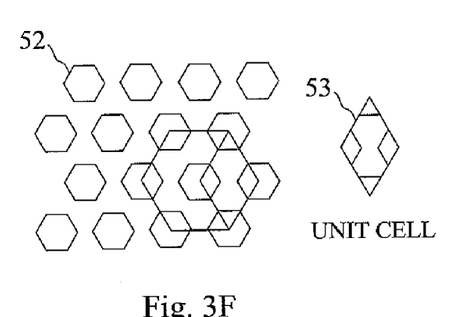

FIG. 1 shows the limitation on the sensitivity of an inertial sensor: the background ground motion of the earth itself, commonly called the new low-noise model (NLNM) 1. A typical noise spectrum at a well designed seismic vault can be many orders of magnitude higher than this, but will very rarely be lower. The self noise of a sensor is often compared with the NLNM 1, since both place a lower limit on the observable magnitude of ground motion. Broadband, weak-motion inertial sensors usually require a self noise below −160 dB 2 with respect to $$1 \frac{m}{s^2 \sqrt{Hz}}$$

in their pass band (typically from 0.1 to 100 seconds).

The magnitude of the thermal acceleration noise $a_{th}$ in inertial sensor is given by the formula:

$$a_{th} = \frac{\sqrt{4 \cdot k_b \cdot T_a \cdot B}}{M} \quad \text{(Eq. 1)}$$

Where:
$k_b$ is Boltzmann's constant;
$T_a$ is the ambient temperature;
B is the viscous damping coefficient; and
M is the seismic mass.

Considering equation Eq.1, there are two ways to decrease the magnitude of thermal acceleration noise: (1) by decreasing B, the viscous damping coefficient, or (2) by increasing M, the seismic mass. While various attempts to decrease the magnitude of the viscous damping coefficient have been made, the most common method for limiting the impact of the Brownian noise floor on sensor performance is through the use of a large seismic mass (e.g., in excess of 100 grams). The use of a large seismic mass inevitably leads to a large sensor size. An alternative method to decrease the magnitude of the Brownian noise floor is to decrease the magnitude of the viscous damping coefficient. For the same Brownian noise floor, a lower viscous damping coefficient presents an opportunity for the use of a smaller seismic mass, and the creation of a smaller sensor. In addition to advantages of portability, reducing seismic mass has two additional benefits: lower power consumption in a force feedback instrument since less force is required to hold the mass at the operating point, and an increased physical robustness to vibration and shock. For a sensor that already utilizes a large seismic mass, a reduction in the viscous damping coefficient presents the opportunity for the Brownian noise floor to be further decreased. Therefore, a reduction in the viscous damping coefficient generally increases the sensor performance per unit volume.

Inertial sensors often use two or more closely spaced electrically conductive plates (termed capacitor plates, capacitive plates, or merely plates) in order to measure ground motion. One or more stationary capacitor plates are typically attached to a frame and one or more moving capacitor plates are typically attached to an inertial mass. The variation in plate spacing Δh for opposing plates and accompanying variation in capacitance between the plates allows the displacement of the inertial mass to be detected. The change in charge ΔQ on the central capacitor plate per change in plate spacing Δh for a commonly used high impedance triple plate capacitive displacement transducer follows the relationship below:

$$\frac{\Delta Q}{\Delta h} \propto \frac{A_E}{h^2} \quad \text{(Eq. 2)}$$

Where:
$A_E$ is the capacitively effective area of the capacitor plates; and
h is the nominal capacitor plate gap height.

Since a high charge output ΔQ is desired from the capacitive displacement transducer, it is advantageous to have both a large capacitively effective area $A_E$ and a small capacitor plate gap h. Because of this, capacitor plates in displacement transducers are positioned in very close proximity (e.g., typically less than 0.5 millimeters).

When the capacitor plates are not perforated, the film of air between the plates that is squeezed when they are moving together or rarefied when they are moving apart provides a substantial viscous damping force. Usually, these plates are at least minimally perforated in order to decrease the magnitude of the viscous damping coefficient. The damping in the capacitive displacement transducer is usually the dominant source of viscous damping in the mechanical system.

However, perforations in a capacitor plate detract from the area that is capacitively effective, making the capacitive displacement transducer less spatially efficient. Capacitor plate size can be a driving factor in the total size of the sensor. Thus by making a capacitive displacement transducer that is spatially efficient, the sensor performance per unit volume can be improved.

For the design of an optimal capacitive displacement transducer there are then two parameters that require consideration: the viscous damping per unit of capacitively effective area; and the ratio of the capacitively effective area to the total area of the capacitor plate. It is desired that the former be minimized and that the latter be large (above 0.5 for a spatially efficient transducer).

Failure to thoroughly consider the plate-fluid interaction in a capacitive displacement transducer has resulted in the inability of current sensor technology to achieve advantageously high sensor performance per unit volume. There is a need to optimize the capacitive displacement transducer in order to simultaneously obtain the minimum possible viscous damping coefficient while maintaining a high spatial efficiency.

Certain exemplary embodiments provide a capacitive displacement transducer for use in a broadband weak-motion inertial sensor having a frame, a movable inertial mass, a forcing transducer for keeping the inertial mass stationary relative to the frame during operation, and a flexure for suspending the movable mass in the frame. Two or more closely spaced, substantially parallel capacitor plates, at least one attached to the frame, and one attached to the movable inertial mass, form a capacitive displacement transducer. The capacitor plates have a plurality of apertures with dimensions and arrangement chosen to simultaneously minimize damping induced thermal noise and give a high spatial efficiency. An embodiment comprises three capacitor plates, each with the same hexagonal pattern of circular holes; the holes are aligned on all three capacitor plates. Radius and spacing of the holes are dictated by a relationship that determines the minimum damping per unit capacitively effective area for a desired spatial efficiency, gap height and capacitor plate thickness. In an embodiment the capacitor plates are made of a printed circuit board material which, through etching of the thin conductive layer, can be mounted directly to a conductive frame and conductive inertial mass without the use of non-conductive spacers.

DETAILED DESCRIPTION OF THE DRAWINGS

FIGS. 2A, 2B, 2C, and 2D show various schematic illustrations of an inertial sensor having an inertial mass 3 pivotably mounted on a frame 4 through one or more flexural elements 5 (four such elements are shown in FIGS. 2A-2D, but one is sufficient for operation). In an embodiment a displacement transducer 10 is formed by three capacitor plates: a bottom plate 6, a frame plate 7, and a top plate 8 (although three capacitor plates are discussed, two capacitor plates—one stationary and one movable—would be sufficient for operation of the sensor; furthermore, alternative embodiments can have the outer plates mounted on the frame and the inner plate mounted on the inertial mass). The frame plate 7 is mechanically (but not electrically) connected to the frame 4, which is in turn mechanically coupled to the ground. By this coupling, a displacement of the ground corresponds to a displacement of the frame 4. The bottom plate 6 and top plate 8 are mechanically (but not electrically) attached to the inertial mass 3 and are made of a conductive material such as metal or a printed circuit board with a conductive material on at least one outer surface. In one embodiment, the inertial mass 3 and frame 4 are made from metal, and the capacitor plates 6, 7, 8 are made from a printed circuit board material. In one embodiment frame stand-offs 11 and boom stand-offs 12 for the capacitor plates 6, 7, 8 are integral to the frame 4 and the inertial mass 3 respectively. To prevent the capacitor plates 6, 7, 8 from short circuiting to the inertial mass 3 or the frame 4, a top metal layer on the capacitor plates 6, 7, 8 can be etched away around the stand-offs 11, 12 leaving non-conductive printed circuit board material 16. In an alternate embodiment, a non-conductive coating can be deposited on top of the conductive material of the capacitor plates 6, 7, 8, which would facilitate the use of integral stand-offs 11, 12. In yet another embodiment, the capacitor plates 6, 7, 8 are manufactured from a suitable conductive material by the process of photochemical machining; in this embodiment the frame stand-offs 11 and the boom stand-offs 12 are non-conductive and are not integral to the frame 4 or the inertial mass 3. The bottom plate 6 and top plate 8 are supplied with a differential oscillating electrical signal. A bottom gap 13 between the bottom plate 6 and frame plate 7 is initially equal to a top gap 14 between the frame plate 7 and top plate 8. The output on the frame plate 7 is zero when the bottom plate 6 and top plate 8 are centered. Upon ground displacement, the frame 4 displaces with the same direction and magnitude, while the inertial mass 3 temporarily remains stationary. The top gap 14 becomes unequal to the bottom gap 13; this gap variance leads to unequal capacitance of the bottom gap 13 and the top gap 14. When the bottom plate 6 and top plate 8 are not centered about the frame plate 7 the output on the frame plate 7 is non-zero. Using the magnitude and phase of this signal, the magnitude and direction of ground displacement can be deduced. The three capacitor plates 6, 7, 8 and associated electronics (not shown) therefore form a capacitive displacement transducer. Feedback electronics process the signal output by the displacement transducer 10 and use it to drive a force transducer 15 (such as a magnetic coil-magnet motor, or an electrostatic force transducer). When driven by the appropriate signal the force transducer 15 keeps the bottom gap 13 essentially equal to the top gap 14 under normal operating conditions.

When the top plate 8 is moving towards the frame plate 7, the top gap height 14 is getting smaller, while the bottom gap height 13 is getting larger. Assuming incompressibility of the fluid, this means that some fluid contained within the top gap 14 must exit, and some additional fluid must enter the bottom gap 13 to fill the newly created void. For this flow to take place, a pressure gradient must be present at every point on the bottom plate 6 and the top plate 8 (with the exception of local pressure maxima and minima). Holes/apertures/voids 9 are formed through at least one of the capacitor plates 6, 7, 8. Outward facing sides of the holes 9 on the bottom plate 6 and the top plate 8 as well as edges of the plates 6, 7, 8 are exposed to ambient fluid and are thus at ambient pressure. Therefore, any point on the inward facing side of the top plate 8, which is moving toward the frame plate 7, is at a higher than ambient pressure to facilitate the outward flow of fluid; conversely, any point on the inward facing side of the bottom plate 6, which is moving away from the frame plate 7, is at a lower than ambient pressure to facilitate the inward flow of fluid. The larger the minimum path between a point on a capacitor plate 6, 7, or 8 and a point at ambient pressure, the greater the pressure difference is from ambient at that point. The difference in pressure between the two sides of the moving capacitor plates 6, or 8 creates a damping force that opposes the motion of the inertial mass 3. Therefore, by decreasing the average minimum path between points on the capacitor plates 6, 7, 8 and points of ambient pressure, it is possible to decrease this form of viscous damping, which is commonly referred to as Reynold's regime damping. In practice, a distance measure 17 between holes 9; a second distance measure 18 between two separate sections of the same hole 9; and a third distance measure 19 between a hole and the edge of the capacitor plate are made as small as practicable.

FIGS. 3A, 3B, 3C, 3D, 3E, and 3F illustrate several embodiments of discrete hole patterns and shapes. The unit cells illustrate the smallest repeating pattern. Circular holes 45 patterned in a square pattern form a unit cell 46 in FIG. 3A; circular holes 45 patterned hexagonally form a unit cell 26 in FIG. 3B; square holes 47 patterned in a square pattern form a unit cell 48 in FIG. 3C; square holes 47 patterned hexagonally form a unit cell 49 in FIG. 3D; slots 50 patterned linearly form a unit cell 51 in FIG. 3E; hexagonal holes 52 patterned hexagonally form a unit cell 53 in FIG. 3F. The hexagonally patterned hole arrangements shown in FIG. 3B, FIG. 3D, and FIG. 3F have the property that all holes are equidistant from the surrounding holes, whereas the square patterned hole arrangements shown in FIG. 3A and FIG. 3C do not possess this property. The symmetry afforded by the hexagonal arrangement of holes decreases the magnitude of the Reynold's regime damping coefficient. The slots configuration shown in FIG. 3E offers a low damping coefficient and can be used in applications where the capacitor plates 6, 7, 8 are made of metal and are relatively thick.

Figure 4A:
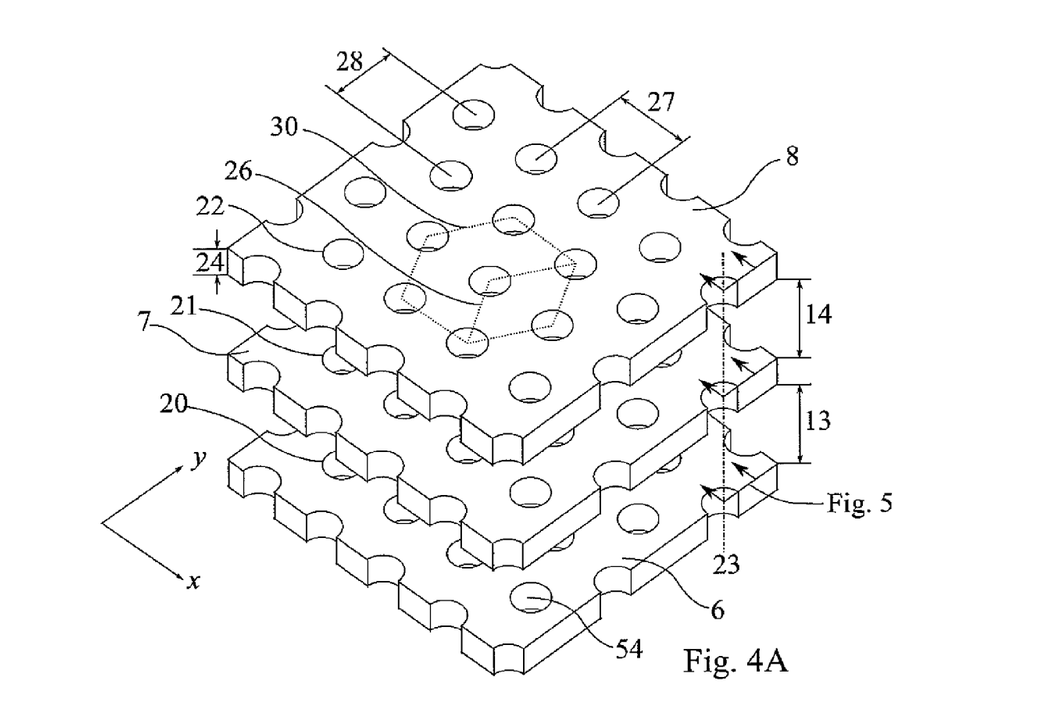
FIGS. 4A and 4B illustrate a section view of an embodiment of a triple capacitor plate and a view of three unit cells of the embodiment respectively.

FIG. 4A shows a section of a multiple capacitor plate 6, 7, 8 configuration according to an illustrative embodiment. Three capacitor plates include a plurality of holes 20 through the bottom plate 6, a plurality of holes 21 through the frame plate 7, and a plurality of holes 22 through the top plate 8. Alternate embodiments may eliminate the holes in either the bottom plate 20 and the top plate 22 or in the frame plate 21.

Referring again to FIG. 4A, the alignment of the holes 20, 21, and 22 across all three capacitor plates 6, 7, 8 is such that a center line 23 perpendicular to the capacitor plates and passing through the center of a hole also passes through the center of holes on the other two plates. Aligning the holes 20, 21, and 22 establishes a configuration in which all of the potential capacitively effective area is utilized by overlapping with capacitively effective area on the opposing plate.

Figure 4B:
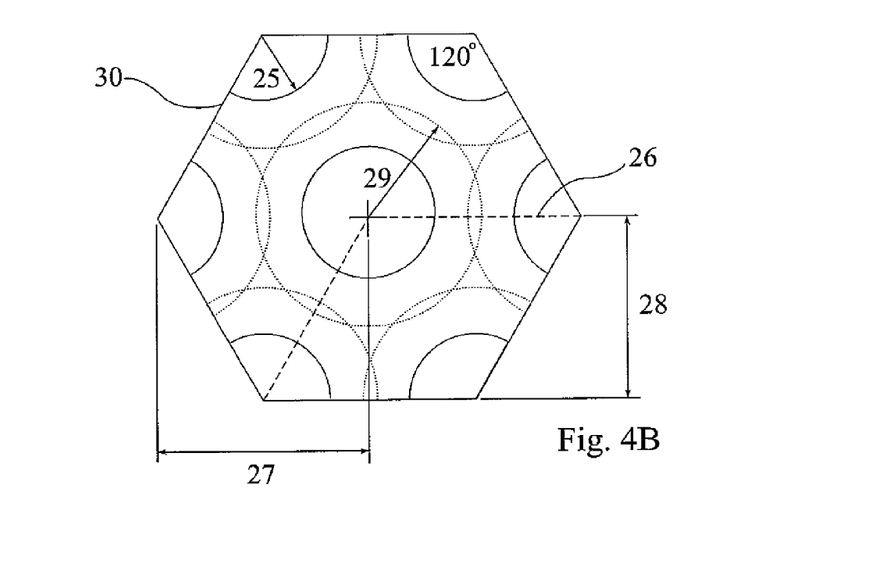

The gap heights 13, 14 are nominal when the bottom plate 6 and top plate 8 are centered about the frame plate 7. Since in practice, a force transducer 15 keeps the outer plates 6, 8 centered, the gap heights 13, 14 are always close to nominal. The thickness 24 and hole radius 25 are consistent for all three capacitor plates. Referring to FIG. 4B, holes are placed in a hexagonal pattern of the unit cell 26 (three unit cells being enclosed by a hexagon 30), with an x pitch 27 and corresponding y pitch 28. Since all holes are equidistant, the x pitch 27 is also the diagonal distance between hole centers. The cell radius 29, used below for damping analysis, is found by equating the area of a circle to the area of a unit cell 26; the resulting circle radius is the cell radius $r_c$ 29, given by:

$$r_c = \sqrt{\frac{\sqrt{3}}{2\pi}} \cdot \xi_h = \frac{r_h}{c} \quad \text{(Eq. 3)}$$

Where:
$\xi$ is the x hole pitch 27;
$r_h$ is hole radius 25; and
c is the ratio of hole radius 25 to cell radius 29.

Figure 5:
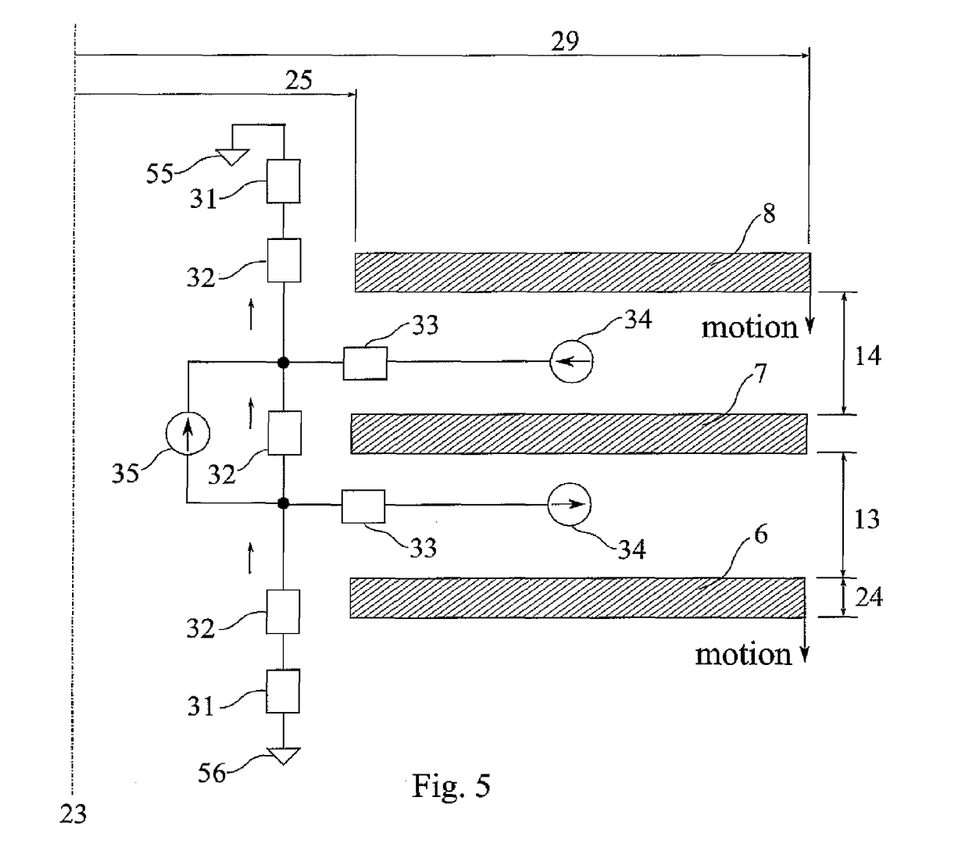
FIG. 5 shows a schematic illustration of a fluidic damping circuit model.

FIG. 5 shows a schematic illustration of a fluidic damping circuit model according to an illustrative embodiment of the plate configuration shown in FIG. 4A. A top ground 55 and a bottom ground 56 indicate ambient pressure. Orifice impedances 31 represent a loss in pressure that occurs when a fluid exits an orifice into a large reservoir. Channel impedances 32 represent the pipe-like losses from shear resistance through a channel 54 shown in FIG. 4A. Transition impedances 33 represent orifice-type losses associated with a transition from squeeze film flow to channel flow. Cell annulus flow sources 34 represent volumetric flow of fluid that is squeezed in an annulus between the hole radius 25 and the cell radius 29 (see FIG. 4B). A moving plate flow source 35 represents the fact that the outer plates 6, 8 are in motion and therefore have more fluid passing through their channels than the frame plate 7. The impedances between ambient pressure and the cell annuli mean that in addition to the pressure gradient induced by Reynold's regime flow, there is an additional rise or fall in pressure that acts again to impede the motion of the outer plates 6, 8. The damping resulting from this effect is referred to as pressure rise damping.

By way of background, factors affecting the magnitude of the damping coefficient B will be discussed. Damping in a triple perforated plate arrangement arises from what can be divided into three distinct sources: Reynold's regime damping (with damping coefficient $B_R$); pressure rise damping (with damping coefficient $B_P$); and shear damping (with damping coefficient $B_S$), caused by the shear forces exerted on the channel 54 walls of the moving plates 6, 8. These three effects are summed to get the total damping coefficient. For the purpose of analysis, the capacitor plate is divided into circular cells of radius $r_c$ 29, allowing a radially symmetric one dimensional relationship to be used for the Reynold's regime damping coefficient. There is assumed to be no flow across the cell boundaries. This division into discrete, circular, one dimensional cells is suited for hexagonally patterned circular holes, but can be used as an approximation for other regularly patterned discrete perforations. Considering a single circular cell, the formulae dictating the fluidic impedances $Z_X$, the Reynold's regime damping $B_R$, the pressure rise damping $B_P$ and the shear damping $B_S$ are given below:

$$Z_O = \frac{3\mu}{r_h^3} \tag{Eq. 4}$$

$$Z_C = \frac{8\mu \cdot T_{cp}}{\pi \cdot r_h^4} \tag{Eq. 5}$$

$$Z_T = \frac{1.2\mu}{h^2 \cdot r_h} \tag{Eq. 6}$$

$$B_R = \frac{3\pi\mu}{2h^3} \cdot r_c^4 \left(-\left(\frac{r_h}{r_c}\right)^4 + 4 \cdot \left(\frac{r_h}{r_c}\right)^2 - 3 - 4 \cdot \ln\left(\frac{r_h}{r_c}\right)\right) \tag{Eq. 7}$$

$$B_P = \left[\left(\frac{Z_C \cdot \pi \cdot r_c^2}{3Z_C + 2Z_O}\right) \cdot (Z_C + Z_O) + \pi(r_c^2 - r_h^2) \cdot Z_T\right] \cdot \pi(r_c^2 - r_h^2) \tag{Eq. 8}$$

$$B_S = \pi \cdot r_h^2 \cdot Z_C \cdot \left(\frac{Z_C \cdot \pi \cdot r_c^2}{3 \cdot Z_C + 2 \cdot Z_O}\right) \tag{Eq. 9}$$

Where:
$\mu$ is the viscosity of the fluid;
h is the height of the capacitor plate gap (13 or 14);
$r_c$ is the cell radius 29;
$r_h$ is the hole radius 25;
$Z_O$ is the fluidic resistance of fluid entering or exiting a hole orifice 31;
$Z_C$ is the fluidic resistance of the fluid traversing the pipe-like channel formed by the holes 32;
$T_{cp}$ is the thickness of the capacitor plates 24; and
$Z_T$ is the fluidic resistance of the fluid in the transition region between squeeze film flow and channel flow 33.

For simplicity, the fluidic resistance at the edge of the capacitor plates is neglected. The choice of gap height 13, 14 and capacitor plate thickness 24 are set by requirements for sensitivity and dimensional stability respectively and are not considered for optimization.

Figure 6:
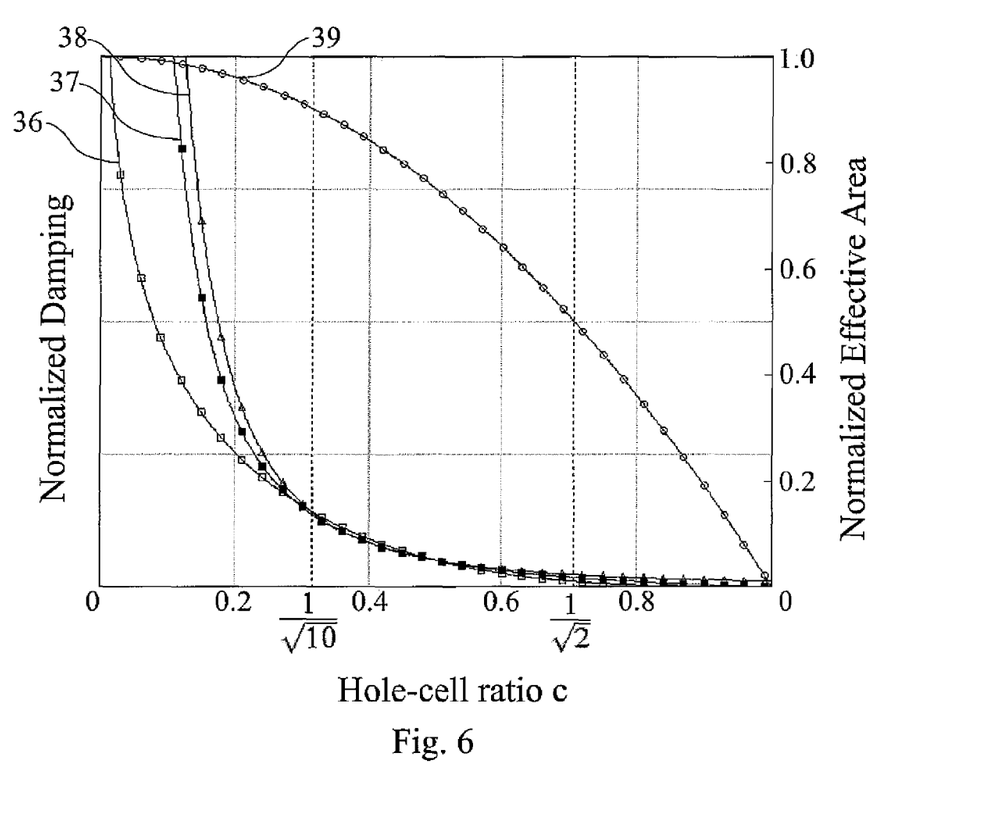
FIG. 6 illustrates a graph that shows different types of damping and capacitively effective area as a function of hole-cell ratio.

FIG. 6 is a graph which illustrates a plot of a Reynold's regime damping 36, a plot of a pressure rise damping 37, and a plot of a shear damping 38, all as a function of the ratio c of hole radius 25 to cell radius 29. These values are normalized about their values at c=0.5 with cell radius 29, capacitor plate thickness 24, capacitor plate gap 13 or 14, and viscosity of the fluid $\mu$ all set arbitrarily to 1. The fraction of cell area that is capacitively effective 39 is also shown; it is entirely a function of the hole-cell ratio c, equaling $1-c^2$. The fraction of effective area 39 is a measure of the spatial efficiency of a capacitive displacement transducer; maximizing the fraction of area 39 that is not perforated and thus useful for capacitance will minimize the total space required for a certain capacitor plate area. A reasonable range of acceptable fractions of capacitively effective area 39 is from 0.5 to 0.9 (for which the values of c are $$\frac{1}{\sqrt{2}}$$

and $$\frac{1}{\sqrt{10}}$$

respectively). For values lower than 0.5 and a given required effective area the size of the capacitive displacement transducer increases rapidly; for values higher than 0.9 the magnitude of the damping increases rapidly. As shown by the plots 36, 37, 38, 39 in FIG. 6, the requirements to maximize effective capacitive area and minimize the total damping are in conflict.

Figure 7:
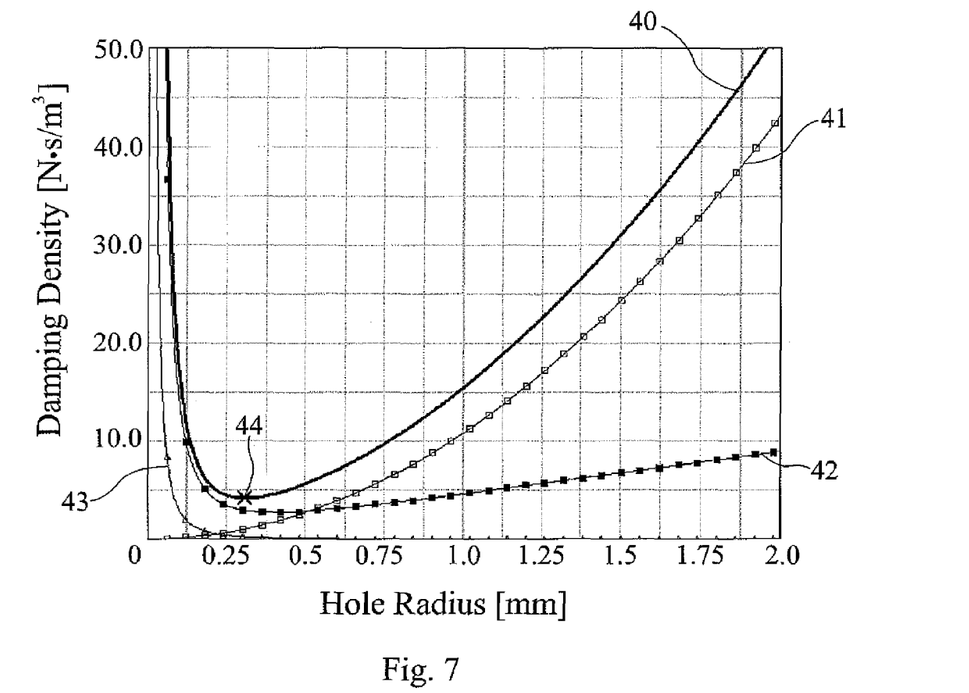
FIG. 7 illustrates a graph that shows: Reynold's regime, pressure rise, shear, and total damping densities as a function of hole radius, and the optimal hole radius—all at a fraction of 0.8 capacitively effective area.

FIG. 7 is a graph that illustrates the relationship between damping density and hole radius when the fraction of capacitively effective area 39 is 0.8; for this fraction the hole-cell ratio c is $$\frac{1}{\sqrt{5}}.$$

Damping density is defined as damping coefficient divided by capacitively effective area and provides a figure of merit for damping per unit sensitivity. The graph of FIG. 7 is based on a capacitor plate gap height 13, 14 of 0.242 mm and capacitor plate thickness 24 of 0.544 mm. The damping density is broken down into Reynold's regime 41, pressure 42, and shear 43 damping. The total damping 40 is also shown. Since the hole-cell ratio c is constant in this graph, a decreasing hole radius 25 is accompanied by a decreasing distance between holes 17. The Reynold's regime damping benefits from the decreasing distance between holes 17 all the way until the hole radius 25 is zero. The fluidic resistances $Z_X$ are all inversely proportional to a power of hole radius 25, which causes the pressure rise 42 and shear 43 damping to rise sharply to infinity as hole radius 25 approaches zero. An optimum hole radius 44 occurs when the sum of all three damping sources is a minimum. At small hole radii 25, including the optimum hole radius 44, pressure rise damping is the dominant source of damping.

Figure 8:
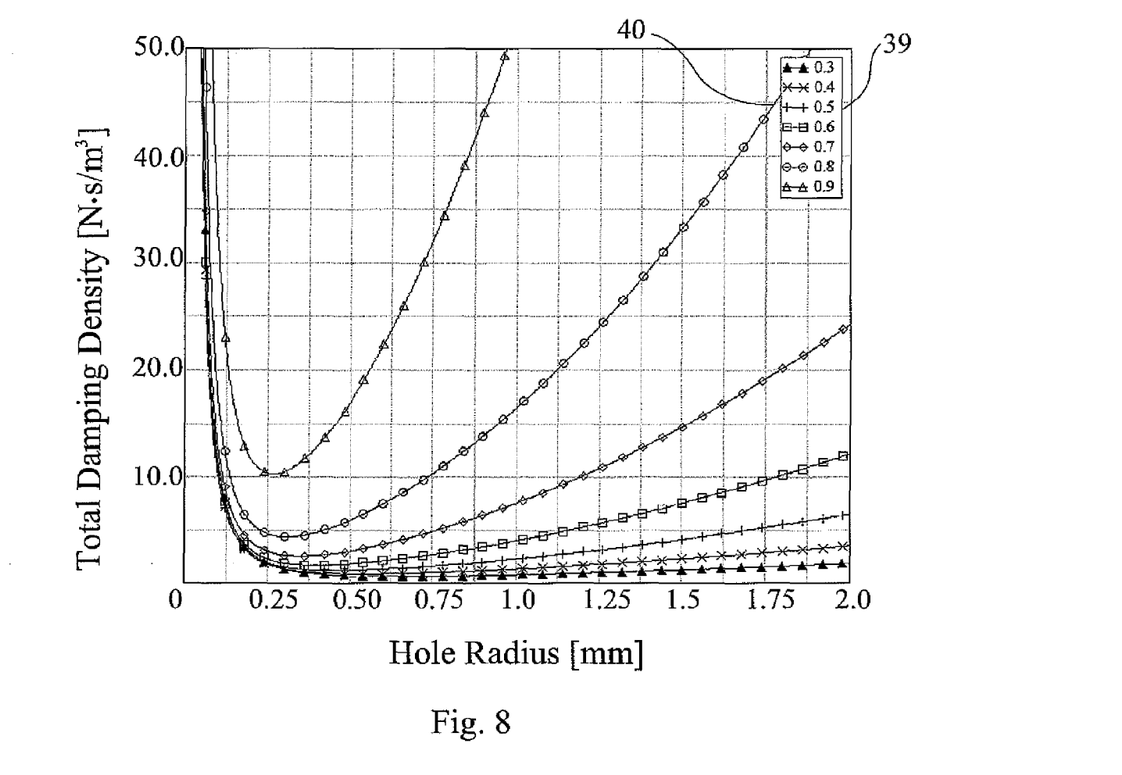
FIG. 8 illustrates a graph that shows the total damping densities for various fractions of capacitively effective area as a function of hole radii.

FIG. 8 is a graph that illustrates the relationship between total damping density and hole radius 25 for several fractions of capacitively effective area 39. The graph of FIG. 8 is based on a capacitor plate gap height 13, 14 of 0.242 mm and capacitor plate thickness 24 of 0.544 mm. The hole radius at which the minimum damping density occurs indicates the lowest possible damping for a desired fraction of effective area 39. For applications in which size is irrelevant, decreasing the fraction of area that is capacitively effective 39 allows for ever decreasing values of damping density, and thus ever decreasing thermal noise. The value of hole radius 25 that minimizes the total damping density in each case is much lower than can be seen in prior art. A hole radius 25 that minimizes total damping density exists for all values of capacitor plate gap height 13, 14, capacitor plate thickness 24, and capacitively effective area percentage 39.

For the embodiment illustrated in FIG. 4A where the damping fluid is air at 20° C., incompressibility is assumed, and the fraction of capacitively effective area 39 is between 0.5 and 0.9, a relationship has been obtained for the optimum hole radius 25 as a function of capacitor plate gap height 13, 14, capacitor plate thickness 24, and fraction of capacitively effective area 39. This relationship is obtained by recognizing that a three dimensional log-log-log plot of optimum hole radius 25, capacitor plate gap height 13, 14, and capacitor plate thickness 24 forms a near plane for a constant fraction of effective area 39. The relationship is as follows:

$$r_{h_{opt}} = (2.15 - 1.41 \cdot F_E) \cdot h^{(0.67 + 0.078 \cdot F_E)} \cdot T_{cp}^{(0.33 - 0.078 \cdot F_E)} \tag{Eq. 10}$$

Where:
$r_{h_{opt}}$ is the value of hole radius 25 which provides the lowest damping per unit effective area;
h is the capacitor plate gap height 13, 14;
$T_{cp}$ is the thickness of the capacitor plates 24; and $F_E$ is the fraction of capacitively effective area 39.

From this equation it is evident that the optimum hole radius is most sensitive to the desired fraction of capacitively effective area 39, and the capacitor plate gap height 13, 14. The ratio of the hole radius 25 to the capacitor plate gap height 13, 14 is typically in excess of five in prior art. However, this formula reveals that the optimal ratio of hole radius 25 to gap height 13, 14 is between one and two for a fraction of effective area 39 between 0.5 and 0.9, and a capacitor plate thickness 24 between one and four times the gap height 13, 14.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

What is claimed is:

1. A capacitive displacement transducer for use in a broadband weak-motion inertial sensor having a frame, a movable inertial mass, a forcing transducer for keeping the inertial mass stationary with respect to the frame during operation and a flexure for suspending the movable mass in the frame, the capacitive displacement transducer comprising:
   a fixed conductive plate operatively connectable to the frame in the broadband weak-motion inertial sensor; and
   a movable conductive plate operatively connectable to the inertial mass, the movable conductive plate being arranged substantially parallel to the fixed conductive plate, being separated by a gap, and experiencing viscous damping when in motion with respect to the fixed conductive plate, at least one of the fixed conductive plate and the movable conductive plate has a plurality of apertures yielding a conductive plate with apertures and a second conductive plate, the conductive plate with apertures having a capacitively effective area and a total area, wherein the capacitively effective area of the conductive plate with apertures comprises a subset of the total area that overlaps and is physically near, as defined by the gap, the second conductive plate, and wherein each aperture of the plurality of apertures has a dimension and an arrangement, relative to other apertures, that are selected based at least in part on an algorithm that defines how to minimize the viscous damping while providing a high spatial efficiency defined as a ratio of the capacitively effective area to the total area.

2. The capacitive displacement transducer of claim 1, wherein a majority of the plurality of apertures are arranged to have a property that an outline of each of the majority of apertures, offset outwards by 1.65 mm in a plane of the conductive plate with apertures, envelops at least a partial section of a selected further aperture or envelops a section of an edge of the conductive plate with apertures.

3. The capacitive displacement transducer of claim 2, wherein the capacitively effective area of at least one of the fixed conductive plate and the movable conductive plate accounts for over 50 percent of the total area.

4. The capacitive displacement transducer of claim 3, wherein at least one of the fixed conductive plate and the movable conductive plate is composed of a printed circuit board material comprising a plastic or ceramic with a thin layer of an electrically conductive material on at least one side.

5. The capacitive displacement transducer of claim 4, wherein at least one of the fixed conductive plate and the movable conductive plate is mountable directly to the frame or the inertial mass.

6. The capacitive displacement transducer of claim 3, wherein the majority of the plurality of apertures have a property that each can be contained by a circle of radius 0.85 mm in a plane of the conductive plate with apertures.

7. The capacitive displacement transducer of claim 6, wherein the plurality of apertures is arranged in a repeating pattern to form an aperture array, and a center to center distance between a selected one of the plurality of apertures and a selected group of the plurality of apertures that directly surrounds the selected one is substantially equal throughout a majority of the aperture array.

8. The capacitive displacement transducer of claim 7, wherein the fixed conductive plate and the movable conductive plate both have apertures.

9. The capacitive displacement transducer of claim 8, wherein a majority of the apertures on the fixed conductive plate and the movable conductive plate are substantially aligned during operation.

10. The capacitive displacement transducer of claim 7, wherein the majority of the plurality of apertures has a property that a smallest radius of a circle that can fully contain each aperture is less than 300 percent of an optimum value of hole radius $r_{hopt}$, described by:

$$r_{hopt} = (2.15 - 1.41 \cdot F_E) \cdot h^{(0.67 + 0.078 \cdot F_E)} \cdot T_{cp}^{(0.33 - 0.078 \cdot F_E)}$$

where:
   a fraction of capacitively effective area $F_E$ is equal to $$1 - \frac{2\pi}{\sqrt{3}} \cdot \left(\frac{r_{hopt}}{\xi_h}\right)^2;$$

a capacitor plate gap height between two opposing plates is h;
   a capacitor plate thickness is $T_{cp}$; and
   a center to center distance between two adjacent holes is $\xi_h$.

11. The capacitive displacement transducer of claim 3, wherein for the majority of the plurality of apertures a ratio of a radius of a circle that fully contains a selected one of the plurality of apertures to the gap height is between one and two.

12. The capacitive displacement transducer of claim 2, wherein at least one of the fixed conductive plate and the movable conductive plate is manufactured from a solid sheet of a suitable conductive material by photochemical machining.

13. The capacitive displacement transducer of claim 1, wherein a substantial area of the conductive plate with apertures is occupied by the plurality of apertures, such that a circle of diameter 1.65 mm can be positioned to envelop multiple separate sections of a given one of the plurality of apertures.

14. The capacitive displacement transducer of claim 13, wherein the capacitively effective area of at least one of the fixed conductive plate and the movable conductive plate accounts for over 50 percent of the total area.

15. The capacitive displacement transducer of claim 13, wherein at least one of the fixed conductive plate and the movable conductive plate is manufactured from a solid sheet of a suitable conductive material by photochemical machining.

16. The capacitive displacement transducer of claim 1, wherein at least one of the stationary conductive plate and the movable conductive plate is composed of a printed circuit board material comprising plastic or ceramic with a thin layer of an electrically conductive material on at least one side.

17. The capacitive displacement transducer of claim 16, wherein at least one of the fixed conductive plate and the movable conductive plate is mountable directly to the frame or the inertial mass.

18. A capacitive displacement transducer for use in a broadband weak-motion inertial sensor having a frame, a movable inertial mass, a forcing transducer for keeping the inertial mass stationary with respect to the frame during operation and a flexure for suspending the movable mass in the frame, the capacitive displacement transducer comprising:

a fixed conductive plate operatively connectable to the frame of the broadband weak-motion inertial sensor; and a movable conductive plate operatively connectable to the inertial mass, the movable conductive plate being arranged substantially parallel to the fixed conductive plate, being separated by a gap, wherein:

the fixed conductive and the movable conductive plate each has apertures;

the fixed conductive plate has a capacitively effective area and a total area;

the capacitively effective area comprises a subset of the total area that overlaps and is physically near, as defined by the gap, the moveable conductive plate; and a majority of the apertures on the fixed conductive plate and the movable conductive plate are substantially aligned during operation.

19. A capacitive displacement transducer for use in a broadband weak-motion inertial sensor having a frame, a movable inertial mass, a forcing transducer for keeping the inertial mass stationary with respect to the frame during operation and a flexure for suspending the movable mass in the frame, the capacitive displacement transducer comprising:

a fixed conductive plate operatively connectable to the frame broadband weak-motion inertial sensor; and a movable conductive plate operatively connectable to the inertial mass, the movable conductive plate being arranged substantially parallel to the fixed conductive plate, being separated by a gap, wherein:

the fixed conductive and the movable conductive plate each has apertures;

the fixed conductive plate has a capacitively effective area and a total area;

the capacitively effective area comprises a subset of the total area that overlaps and is physically near, as defined by the gap, the moveable conductive plate; and a majority of the apertures has a property that a smallest radius of a circle that can fully contain each aperture is less than 300 percent of an optimum value of a hole radius that is defined based on the following parameters: a fraction of capacitively effective area, a capacitor plate gap height, a capacitor plate thickness, and a center to center distance between two adjacent holes.

20. The capacitive displacement transducer of claim 19, wherein the optimum value of the hole radius is $r_{hopt}$, and is described by:

$$r_{hopt} = (2.15 - 1.41 \cdot F_E) \cdot h^{(0.67 + 0.078 \cdot F_E)} \cdot T_{cp}^{(0.33 - 0.078 \cdot F_E)}$$

where:

a fraction of capacitively effective area $F_E$ is equal to $$1 - \frac{2\pi}{\sqrt{3}} \cdot \left(\frac{r_{hopt}}{\xi_h}\right)^2;$$

a capacitor plate gap height between two opposing plates is h;

a capacitor plate thickness is $T_{cp}$; and a center to center distance between two adjacent holes is $\xi_h$.

* * * * *